Figure 1:
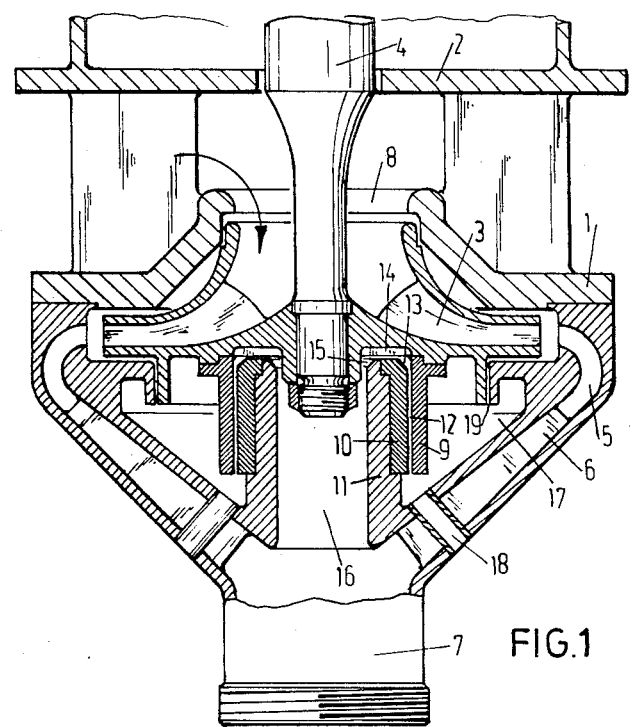

United States Patent [19]
Laméris

[11] 3,871,789
[45] Mar. 18, 1975

[54] VERTICAL ROTATABLE CENTRIFUGAL PUMP

[75] Inventor: Herman Johannes Laméris, Hengelo, Netherlands

[73] Assignee: Koninklijke Machinefabriek Stork B.V., Hengelo, Netherlands

[22] Filed: June 29, 1973

[21] Appl. No.: 375,023

[52] U.S. Cl. .................................. 415/112, 415/176
[51] Int. Cl. ...................... F04d 29/04, F01d 25/16
[58] Field of Search .......... 415/110, 111, 112, 69 R, 415/69 A, 176; 308/122; 277/133

[56] References Cited
UNITED STATES PATENTS
| | | | |
|---|---|---|---|
| 2,921,533 | 1/1960 | Williams | 415/112 |
| 3,431,860 | 3/1969 | Atz | 415/112 |
| 3,620,639 | 11/1971 | Gaffal | 415/111 |
| 3,671,137 | 6/1972 | Ball | 415/111 |

Primary Examiner—C. J, Husar
Assistant Examiner—Louis J. Casaregola
Attorney, Agent, or Firm—Snyder, Brown and Ramik

[57] ABSTRACT

A vertical rotatable centrifugal pump for pumping fluid metals, more particularly sodium, comprising a rotor journalled in a hydrostatic bearing in which the pumped fluid is utilized as a bearing fluid wherein the rotor is provided with an auxiliary impeller whose suction side communicates with the pressure space of the pump and whose pressure side communicates with the hydrostatic bearing feed and wherein the delivery side of the bearing communicates with the space in the pump, in which low pressure prevails.

6 Claims, 2 Drawing Figures

PATENTED MAR 18 1975   3,871,789

VERTICAL ROTATABLE CENTRIFUGAL PUMP

The invention relates to a vertical rotatable centrifugal pump for pumping fluid metals, more particularly sodium comprising a rotor journalled in a hydrostatic bearing in which the pumped fluid is utilized as a bearing fluid. In such a pump the pressure available to the hydrostatic bearing is equal to or lower than the pressure prevailing on the pressure side of the pump. This has the disadvantage that with a drop of counter-pressure, the number of revolutions of the pump being the same, for example due to a decrease of the resistance of the circuit traversed by the fluid to be pumped, the pressure at the area where the fluid is fed to the bearing also drops. As a result the carrying capacity of the bearing decreases. The invention has for its object to provide a pump in which this disadvantage does not occur.

According to the invention the rotor is provided with an auxiliary impeller whose suction side communicates with the pressure space of the pump and whose pressure side communicates with the hydrostatic bearing feed, whilst the outlet of the bearing communicates with a space of the pump in which low pressure prevails.

It can thus be ensured that at the entrance of the bearing gap the pressure is materially higher than the pressure prevailing on the pressure side of the pump. As a result the carrying capacity of the bearing increases and the range of operation of the pump is subject to fewer restrictions.

According to the invention the space in which the low pressure prevails can communicate through apertures in the blades of the diffusor with the suction space of the pump. Then on the delivery side of the bearing the suction pressure of the pump will prevail.

In one embodiment of the invention the outer sleeve of the hydrostatic bearing may be fastened to the rotor and the inner sleeve thereof may be secured to the housing of the pump.

According to the invention, as an alternative, the inner sleeve of the hydrostatic bearing may be secured to the rotor, whereas the outer sleeve thereof may be fastened in the pump housing.

The invention will now be described more fully with reference to the drawing, which shows a few embodiments. In the drawing FIG. 1 is a sectional view of the pump embodying the invention taken along the axis of the rotor.

Figure 2:
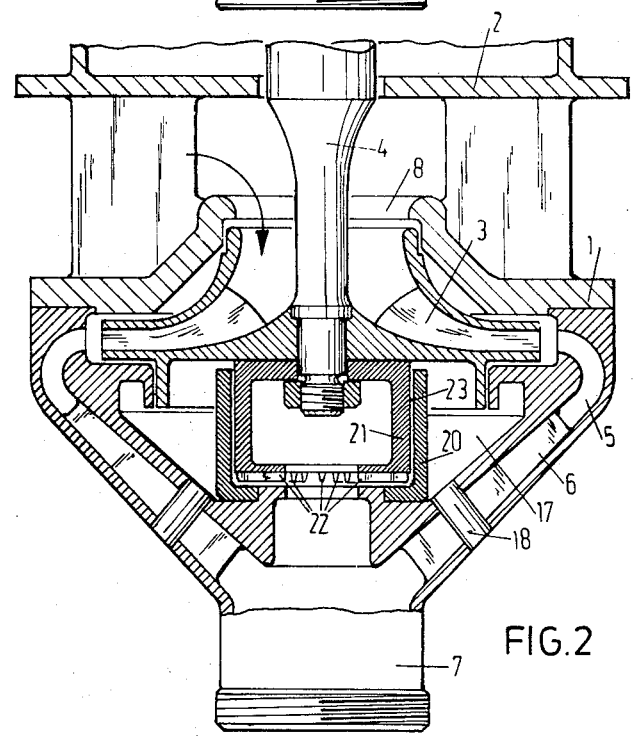

FIG. 2 is a sectional view corresponding with that of FIG. 1 of a pump embodying the invention in a differing structure.

The pump shown in FIG. 1 comprises a housing 1 secured to the top wall of a vessel 2. The housing accommodates an impeller 3 seated on a shaft 4. The housing has a diffusor portion 5 in which blades 6 are arranged. The diffusor portion 5 communicates with the pressure stub 7 of the housing. The pump is immersed in the fluid in the vessel 2 and sucks it in on the top side through the opening 8. The impeller 3 presses the fluid towards the diffusor portion 5, where the velocity of the fluid can be converted into pressure and the fluid leaves the pump via the pressure stub 7.

The impeller 3 is provided with a simultaneously rotating bearing sleeve 9, which co-operates with an inner sleeve 10 fastened to a portion 11, which is integral with the housing. A bearing 12 is formed between the sleeves 9 and 10. At the end facing the impeller the gap 12 communicates with a space 13, which communicates in turn with the outer periphery of an auxiliary impeller 14, which forms part of the shield of the impeller 3. The auxiliary impeller 14 is capable of sucking in fluid from the space 15, which communicates with the space 16, in which the delivering pressure of the pump is prevailing which occurs at the exit end of the diffusor portion 5.

In the operation of the pump the fluid subjected to the delivering pressure of the pump is sucked out of the space 15 by the auxiliary impeller 14 and delivered into the space 13. In the space 13 a pressure will therefore prevail, which exceeds the value corresponding to the delivering pressure of the pump. This has the advantage that the hydrostatic bearing formed by the sleeves 9 and 10 receives fluid of such a high pressure that a decrease in counter-pressure of the pump does not adversely affect the carrying capacity of the hydrostatic bearing. The gap 12 opens out at the other end in the space 17, which communicates through apertures 18 in the blades 6 with the space in the vessel 2. This means that the suction pressure of the pump is prevailing in the space 17.

The space 17 is separated from the space between the diffusor portion 5 and the exit end of the impeller 3 by means of the sealing gap 19.

The embodiment shown in FIG. 2 corresponds largely with that shown in FIG. 1. The difference resides in at the outer sleeve 20 of the hydrostatic bearing is rigidly secured to the housing 1 and the inner sleeve 21 is fastened to the impeller 3. Between the sleeves 20 and 21 a gap 23 is formed, which communicates with the exit end of an impeller 22, which forms part of the sleeve 21. Also this impeller 22 sucks in fluid subjected to the compressive pressure of the pump. The gap 23 thus receives high-pressure fluid. This provides the same advantage as the embodiment shown in FIG. 1.

What I claim is:

1. A vertical rotatable centrifugal pump for pumping fluid metals, more particularly sodium, comprising a rotor journalled in a hydrostatic bearing in which the pumped fluid is utilized as a bearing fluid characterized in that the rotor is provided with an auxiliary impeller whose suction side communicates directly with the pressure space of the pump and whose pressure side communicates with the hydrostatic bearing feed and in that the delivery side of the bearing communicates with a low pressure space which communicates through aperatures in the blades of the diffuser with the suction space of the pump.

2. A pump as claimed in claim 1, characterized in that the outer sleeve of the hydrostatic bearing is fastened to the rotor and the inner sleeve of said bearing is secured in the housing of the pump.

3. A pump as claimed in claim 1 characterized in that the inner sleeve of the hydrostatic bearing is secured to the rotor and the outer sleeve is fastened in the housing of the pump.

4. A vertical rotatable centrigufal pump for pumping fluid metals such as sodium, comprising in combination:

a vertical drive shaft having a centrifugal impeller fixed to the lower end of said shaft;

a housing surrounding said impeller and presenting an inlet opening around said shaft;

a diffusor assembly cooperating with said housing to enclose said impeller, said diffusor assembly including a hollow discharge stub disposed centrally below said impeller and a diffusor section leading from the periphery of said impeller to said discharge stub, said diffusor section having spaced inner and outer walls defining a diffusor channel therebetween and said inner wall defining an enclosed space with the underside of said impeller, said inner wall having an opening aligned and communicating with said discharge stub so as to provide a source of fluid metal whose pressure is that present in said discharge stub;

a hydrostatic bearing supporting the lower end of said shaft, said bearing comprising an inner sleeve and an outer sleeve coaxial with said shaft and defining a gap therebetween, one of said sleeves being connected with said shaft and impeller for rotation therewith and the other of said sleeves being fixed to the inner wall of said diffusor assembly; and an auxiliary pump for inducting fluid metal from said source thereof and discharging it into said gap to flow into said enclosed space, said enclosed space communicating with the inlet side of the first mentioned impeller through passage means extending through said inner and outer walls of the diffusor section, said auxiliary pump comprising an auxiliary impeller having an inlet eye communicating directly with said opening and a periphery communicating directly with said gap at one end of the sleeves, the opposite end of the sleeves discharging directly into said enclosed space.

5. A pump as defined in claim 4 wherein said inner wall of the diffusor section is provided with an upstanding stub extending upwardly to a point closely adjacent the underside of the first mentioned impeller and defining said opening, said auxiliary impeller being formed on said underside of the first mentioned impeller and said inner sleeve being on said upstanding stub.

6. A pump as defined in claim 4 wherein said inner sleeve is secured to said shaft and extends downwardly to a point closely adjacent said opening, and said auxiliary impeller being formed at the lower end of said inner sleeve.

* * * * *

UNITED STATES PATENT OFFICE
CERTIFICATE OF CORRECTION

PATENT NO. : 3,871,789
DATED : March 18, 1975
INVENTOR(S) : Herman Johannes Laméris It is certified that error appears in the above-identified patent and that said Letters Patent are hereby corrected as shown below:

Foreign Application Priority Data
[30] July 4, 1972 Netherlands............7209338

Signed and sealed this 29th day of April 1975.

(SEAL)
Attest:

RUTH C. MASON
Attesting Officer

C. MARSHALL DANN
Commissioner of Patents
and Trademarks